INVENTORS
Seymour Absatz
John L. Citu Jr.
BY Bonet & Bonet
ATTORNEYS

INVENTORS
Seymour Absatz
John L. Citu Jr.
BY Borst & Borst
ATTORNEYS

DIGITAL-TO-ANALOG CONVERTER

Filed April 11, 1961

INVENTORS
Seymour Absatz
John L. Cifu, Jr.
BY Bosst & Bosst
ATTORNEYS 3,225,345
DIGITAL-TO-ANALOG CONVERTER Seymour Absatz, Plainview, and John Lewis Cifu, Jr., Flushing, N.Y., assignors to Sperry Rand Corporation, Ford Instrument Company Division, Wilmington, Del., a corporation of Delaware
Filed Apr. 11, 1961, Ser. No. 102,244
7 Claims. (Cl. 340—347)

This invention relates to a transistorized converter mechanism by which digital information imparted thereto in parallel binary form from a source of information is converted to a full wave D.C. analog output and discharged to a receiver which is adapted to be controlled and actuated by the analog output.

Heretofore the common methods of converting a digital input to an analog output generally employed D.C. operational amplifiers utilizing chopper stabilization techniques in order to minimize the inherent drift in D.C. amplifiers. These techniques are satisfactory when used with vacuum tube type amplifiers, but when one uses transistors in a D.C. operational amplifier a complex circuitry is required, which in most cases prohibits the use of transistors in D.C. operational amplifiers.

It is therefore the principal object of this invention to eliminate the use of this complex circuitry in digital to analog converters which employ transistors. To this end applicants employ techniques, which to the best of their knowledge have not heretofore been used, in which A.C. amplification is employed in the place of D.C. amplification, thereby circumventing the problem of drift inherent in D.C. amplifiers.

Another object of the invention is to provide a transistorized digital to analog converter mechanism which is of simple construction and very efficient and accurate in operation.

An "8" bit transistor digital to analog converter mechanism is disclosed herein which comprises generally a digital input circuitry, an A.C. amplier, a full wave demodulator, a logic circuitry which includes a conventional transistor astable multivibrator, and a filter network. Digital information is imparted in parallel binary form from a source of digital information, such as a digital computer, to the input circuitry which feeds it to the A.C. amplifier through a summing transformer. The A.C. output of the amplifier is imparted, through a step-up transformer, to the demodulator which converts the A.C. input voltage to a proportional full wave D.C. output voltage, which may be either positive or negative, as determined by the logic circuitry in accordance with the polarity of the digital input signals. The output voltage of the demoulator is imparted to a load, such as a servo motor, through a circuit which includes the filter network which is provided to filter out the gating ripple voltage.

Figure 1:
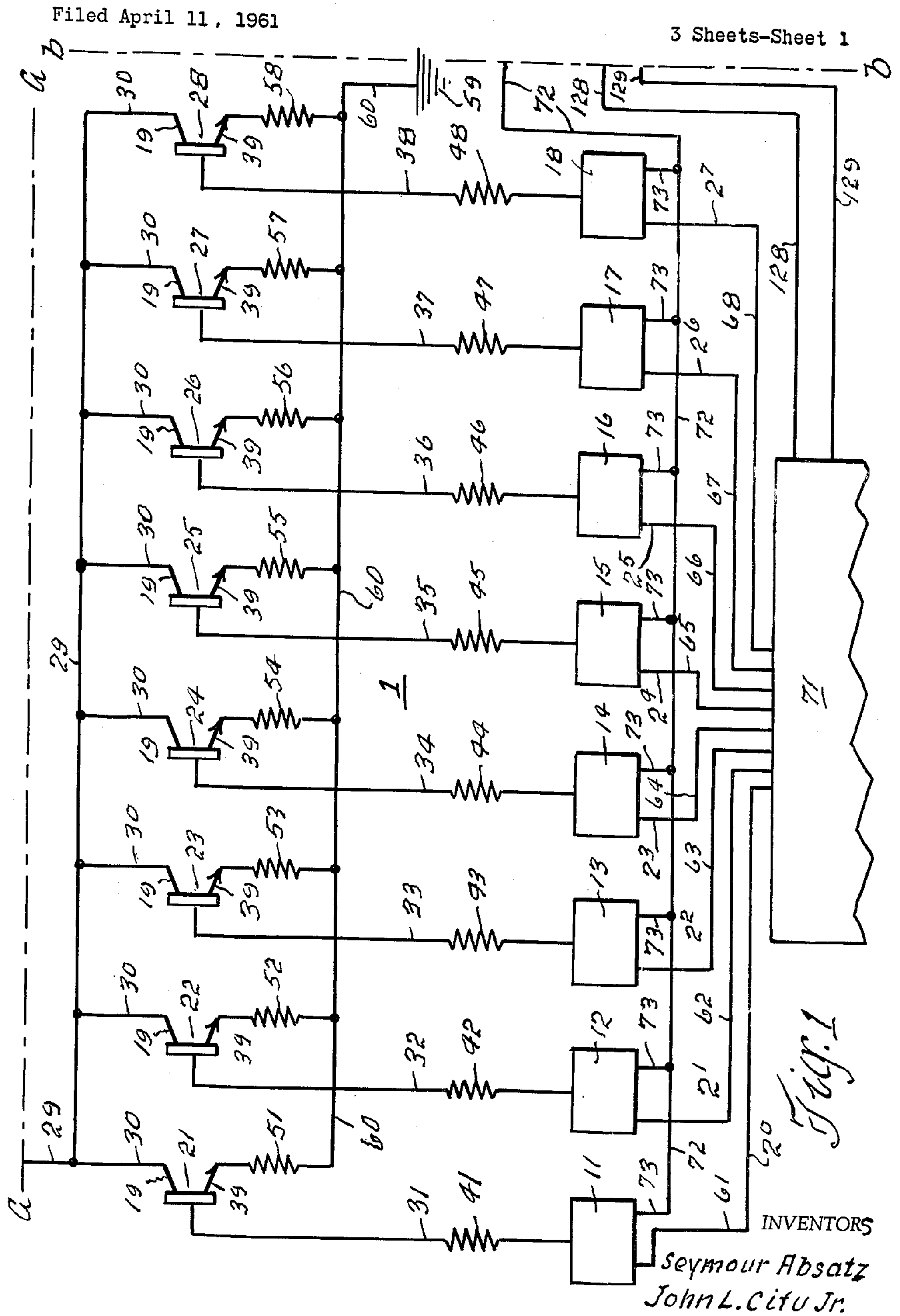
Figure 2:
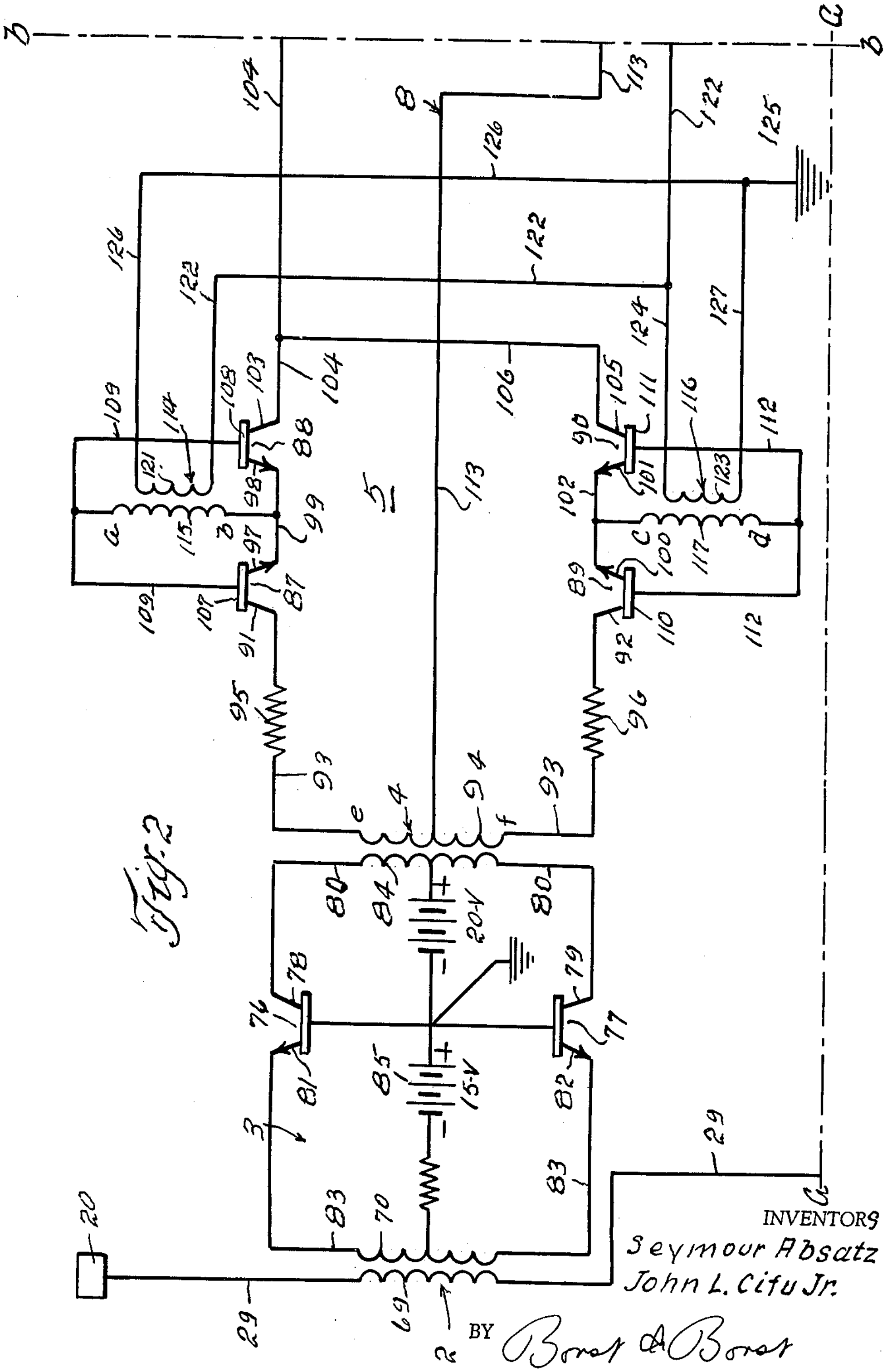
Figures 3, 4:
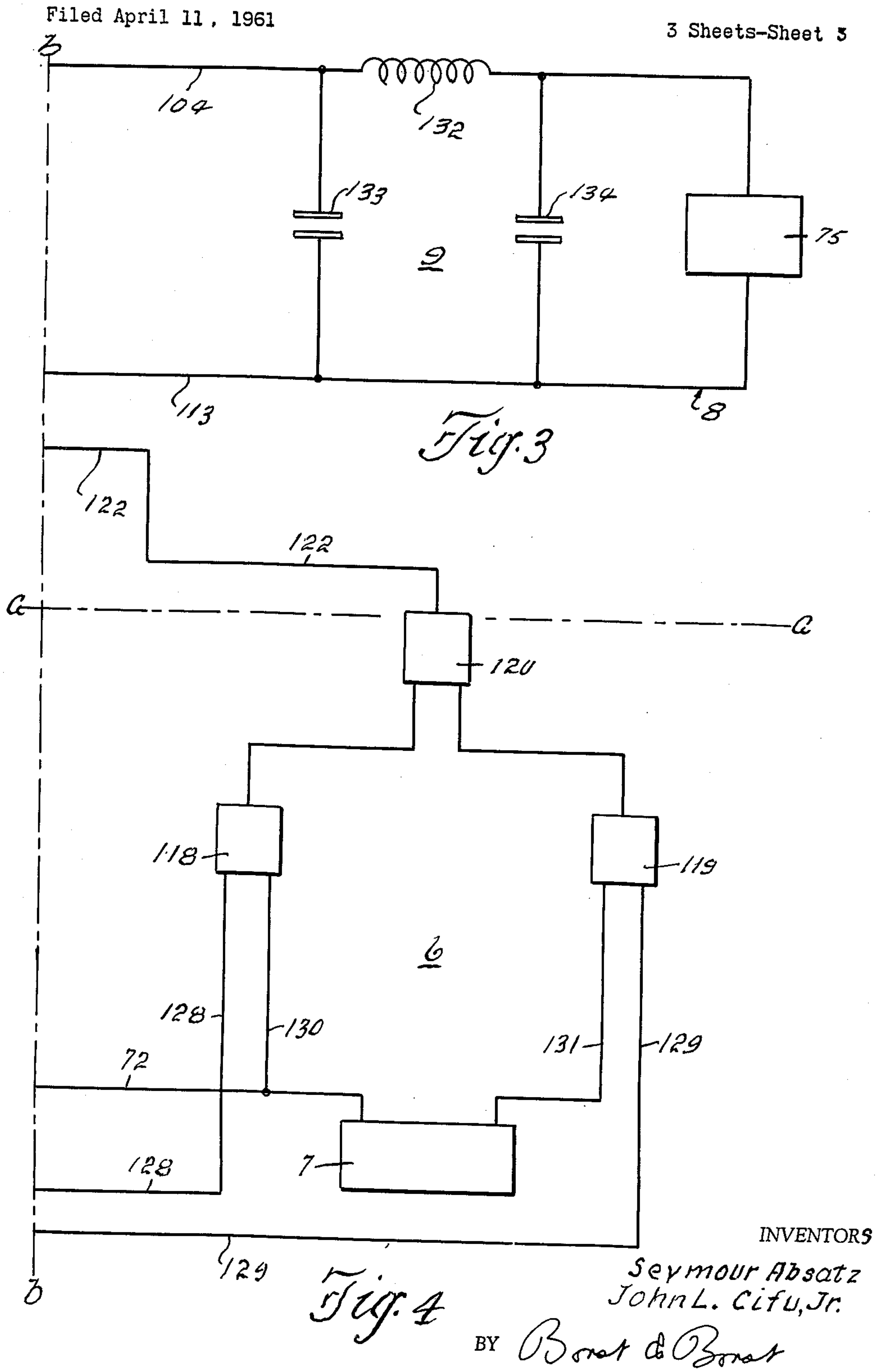

Having stated the principal objects of the invention, other and more specific objects thereof will be apparent from the following specification and the accompanying drawings forming a part thereof in which:

FIGS. 1 to 4 are diagrammatic views which when connected together on the lines *a—a* and *b—b* diagrammatically illustrate the transistorized digital to analog converter mechanism of the present invention.

The specific construction and operation of the converter mechanism will now be described in connection with the drawing with the use of reference characters. As previously stated, an "8" bit digital to analog converter mechanism is disclosed which comprises the digital input circuitry generally indicated by the numeral 1, the summing transformer generaly indicated by the numeral 2, an A.C. amplifier generally indicated by the numeral 3, the step-up transformer generally indicated by the numeral 4, the full wave demodulator generally indicated by the numeral 5, the logic circuitry which is generally indicated by the numeral 6 and includes a conventional astable multivibrator 7, the output circuit 8 for the demodulator 5, and the filter network 9 which is interposed in the output circuit 8 for the demodulator 5.

The digital input circuitry 1 comprises eight "and" gates which are designated by the numerals 11 to 18 respectively. Eight transistor switches, designated 21 to 28, are provided, which are respectively connected to the "and" gates 11 to 18, by conductors 31 to 38 in which series resistors 41 to 48 are respectively interposed. A low voltage D.C. supply, of approximately 20 volts, is constantly applied to the transistors 21 to 28 through the collectors 19 thereof from a voltage source 20 through a main conductor 29 and branch conductors 30. The emitters 39 of the transistors 21 to 28 respectively connected to emitter resistors 51 to 58 which in turn are all connected to a ground 59 by a conductor 60.

The primary winding 69 of the summing transformer 2 is interposed in the conductor 29 between the voltage source 20 and the transistors 21 to 28, and the secondary winding 70 of the summing transformer 2 is interposed in the circuitry of the A.C. amplifier 3. The summing transformer 2 is so designed that the primary D.C. resistance in the primary winding 69 and the reflected A.C. impedance in the secondary winding 70 are negligible when compared to the emitter resistors 51 to 58.

Digital information having either positive or negative polarity in binary series is fed in parallel from a source of information, such as a digital computer 71, to the "and" gates 11 to 18 respectively, through the conductors 61 to 68 respectively. The binary values of the digital "bits" fed to the "and" gates 11 to 18 respectively, from the computer 71 through the conductors 61 to 58 are as follows: $2^0$ is fed to gate 11, $2^1$ is fed to gate 12, $2^2$ is fed to gate 13, $2^3$ is fed to gate 14, $2^4$ is fed to gate 15, $2^5$ is fed to gate 16, $2^6$ is fed to gate 17, and $2^7$ is fed to gate 18. The input reference voltage for the "and" gates 11 to 18, which is at a higher frequency than the digital information voltage imparted thereto, is supplied by the multivibrator 7 through a main conductor 72 and branch conductors 73. The "and" gates 11 to 18 sample the digital information imparted thereto and present it in A.C. form to the transistors 21 to 28 through the series resistors 41 to 48 and conductors 31 to 38. The series resistors 41 to 48 are so selected that each transistor is operated when digital information is present, at a point where the collector junction voltage is zero, which is at a point immediately below saturation. The emitter resistors 51 to 58 are so selected that each one thereof proportionately weights the binary input information imparted thereto. When a transistor is in saturation the collector current that flows is primarily determined by the collector voltage and the emitter resistor. Therefore, the total current that flows in the summing transformer is proportional to the magnitude of the digital input signals and is in A.C. form.

The amplifier 3 is provided to obtain the necessary voltage gain required to control and operate a load such as a servo motor 75. The amplifier 3 is of the common base push-pull type which is used in order to obtain an output which is linearly proportional to the input current and exhibits a low input impedance characteristic as required for the summing transformer 2. The amplifier 3 comprises the transistors 76 and 77 having the collectors 78 and 79 thereof connected together by a conductor 80, and the emitters 81 and 82 thereof connected together by a conductor 83. The secondary winding 70 of the summing transformer 2 is interposed in the conductor 83, and the primary winding 84 of the step-up transformer 4 is interposed in the conductor 80.

The transistors 76 and 77 are biased for "Class A" push-pull operation by the −15 volt supply 85 and that resistor positioned between winding 70 and supply 85 in order to obtain the maximum linear proportional output voltage. The output voltage gain of the amplifier 3 is determined by the selection of the turns ratio for the transformers 2 and 4.

The A.C. output of the amplifier 3 is fed to the full wave demodulator 5 which is provided to convert the A.C. input voltage imparted thereto to a full wave D.C. output voltage of the desired polarity. The demodulator 5 comprises a pair of serially connected transistors 87 and 88, and a second pair of serially connected transistors 89 and 90 which are disposed in opposing relation to the pair of resistors 87 and 88. The collector 91 of the transistor 87 is connected to the collector 92 of the transistor 89 by a conductor 93 in which the secondary winding 94 of the step-up transformer 4 is interposed. To minimize ringing in the transformer 4 the series resistors 95 and 96 are also interposed in the conductor 93, one on each side of the winding 94 of the transformer 4. The emitter 97 of the transistor 87 is connected to the emitter 98 of the transistor 88 by a conductor 99; and the emitter 100 of the transistor 89 is connected to the emitter 101 of the transistor 90 by a conductor 102. The collector 103 of the transistor 88 is connected to the servo motor 75 by a conductor 104; and the emitter 105 of the transistor 90 is connected to the servo motor 75 by the conductors 106 and 104. The base 107 of the transistor 87 is connected to the base 108 of the transistor 88 by a conductor 109; and the base 110 of the transistor 89 is connected to the base 111 of the transistor 90 by a conductor 112. The median point of the secondary winding 94 of the transformer is connected to the other side of the servo motor 75 by a conductor 113. A reference voltage is applied to the transistors 87 and 88 by a transformer 114 in which the secondary winding 115 thereof is connected between the conductors 99 and 109; and a reference voltage is applied to the transistors 89 and 90 by a transformer 116 in which the secondary winding 117 thereof is connected between the conductors 102 and 112. The polarity of the analog D.C. output voltage of the demodulator 5 is determined by the phase of the reference voltage applied by the transformers 114 and 116.

The polarity of the reference voltage applied to the transistors 87 and 88 by the transformer 114, and to the transistors 89 and 90 by the transformer 116 is determined by the logic circuitry 6 in accordance with the polarity of the digital input signals imparted to the "and" gates 11 to 18. The logic circuitry 6 comprises a pair of "and" gates 118 and 119, an "or" gate 120, and the astable transistor multivibrator 7. One side of the primary winding 121 of the transformer 114 is connected to the "or" gate 120 by a conductor 122, and the opposite side of the primary winding 123 of the transformer 116 is connected to the "or" gate 120 by a conductor 124 and the conductor 122. The other side of the primary winding 121 of the transformer 114 is connected to a ground 125 by a conductor 126, and the other side of the primary winding 123 of the transformer 116 is connected to the ground 125 by a conductor 127 and the conductor 126. The "and" gate 118 is connected to the computer 71 by a conductor 128, and the "and" gate 119 is connected to the computer 71 by a conductor 129. The outputs 130 and 131 of the multivibrator 7, which are 180° out of phase, are connected to the "and" gates 118 and 119 respectively. Simultaneously with the imparting of a digital input signal to one of the "and" gates 11 to 18 by the computer 71, it imparts a polarity pulse to one of the "and" gates 118 or 119 which is in accordance with the polarity of the digital input signal imparted to one of the "and" gates 11 to 18. Positive pulses are imparted to the "and" gate 118 through the conductor 128, and negative pulses are imparted to the "and" gate 119 through the conductor 129. The proper phase for the D.C. analog output of the demodulator 5 is thereby determined.

The operation of the demodulator 5 in converting the A.C. input current to either a positive or a negative full wave D.C. output current will now be explained, it being first assumed that the signal and reference voltages are in phase and that the side "*a*" of the transformer 114 is positive with respect to the side "*b*" thereof and that the side "*c*" of the transformer is positive with respect to the side "*d*" thereof. The emitters 97 and 98 of the transistors 87 and 88 respectively are therefore both forward biased, and the collector 103 of transistor 88 is forward biased due to the reference voltage, and the collector 91 of the transistor 87 is back biased due to the signal voltage, and the emitters 100 and 101 of the transistors 89 and 90 respectively are both back biased. The transistor 87 is therefore properly biased for transistor operation and current flows from the side "*e*" of the secondary winding 94 of the transformer 4 through the collector 91 of the transistor 87 to the emitter 97 thereof. Since the transistor 88 is not properly biased for transistor action the current from the emitter 97 of the transistor 87 cannot flow through the emitter 98 of the transistor 88. Therefore it flows from the emitter 97 of the transistor 87 through the winding 115 of the transformer 114 to the collector 103 of the transistor 88 and out through the conductor 104 in a positive direction to the load 75 and back through the conductor 113 to the secondary winding 94 of the transformer 4. Since the emitters 100 and 101 of the transistors 89 and 90 are both back biased no current will flow from the side "*f*" of the winding 94 to the load 75. But 180° later the situation is reversed and the transistor 89 acts as a transistor. Current then flows from the side "*f*" of the winding 94 through the collector 92 of the transistor 89 to the emitter 100 thereof. Since the transistor 90 is not properly biased for transistor action the current from the emitter 100 of the transistor 89 cannot flow through the emitter 101 of the transistor 90. Therefore it flows from the emitter 100 of the transistor 89 through the winding 117 of the transformer 116 to the collector 105 of the transistor 90 and out through the conductors 106 and 104 in a positive direction to the load 75, and back to the winding 94 of the transformer 4. In this manner a full wave positive output signal is obtained.

When the reference voltages are phase reversed the signal and reference voltages are out of phase and the side "*a*" of the transformer 114 is negative with respect to the side "*b*" thereof, and the side "*c*" of the transformer 116 is negative with respect to the side "*d*" thereof. The emitters 97 and 98 of the transistors 87 and 88 respectively are therefore both back biased, and the collector 103 of the transistor 88 is back biased due to the reference voltage, and the collector 91 of the transistor 87 is forward biased due to the signal voltage, and the emitters 100 and 101 of the transistors 89 and 90 respectively are both forward biased. The transistor 88 is therefore properly biased for transistor operation and current flows from the secondary winding 94 of the step-up transformer 4 through the conductor 113 to the load 75 and back from the load through the conductor 104 through the collector 103 of the transistor 88 to the emitter 98 thereof. Since the transistor 87 is not biased for transistor action the current from the emitter 98 of the transistor 88 cannot flow through the emitter 97 of the transistor 87. Therefore it flows from the emitter 98 of the transistor 88 through the winding 115 of the transformer 114 to the collector 91 of the transistor 87 and back through the conductor 93 in a negative direction to the side "*e*" of the secondary winding 94 of the step-up transformer 4. Since the emitters 100 and 101 of the transistors 89 and 90 are both forward biased no current will flow from the load back to the side "*f*" of the winding 94. But 180° later the situation is reversed and the transistor 90 acts as a transistor. Current then flows from the winding 94 through the conductor 113 to the load 75 and back from the load through the conductors 104 and 106 and through the collector 105 of the transistor 90 to the emitter 101 thereof. Since the transistor 89 is not properly biased for transistor action, the current from the emitter 101 of the transistor 90 cannot flow through the emitter 100 of the transistor 89. Therefore it flows from the emitter 101 of the transistor 90 through the winding 117 of the transformer 116 to the collector 92 of the transistor 89 and out through the conductor 93 in a negative direction back to the side "*f*" of the winding 94. In this manner a full wave negative output signal is obtained. It will therefore be seen that the phase relationship of the reference voltage with respect to the signal voltage determines the polarity of the output signal.

In order to filter out the gating ripple voltage a conventional type filter network comprising the winding 132 and the capacitors 133 and 134 is connected across the conductors 104 and 113.

From the foregoing it will be apparent to those skilled in this art that we have provided a very simple and efficient mechanism for accomplishing the objects of the invention.

It is to be understood that we are not limited to the specific construction shown and described herein, as various modifications may be made therein within the spirit of the invention and the scope of the appended claims. For instance, among other things, the logic circuitry 6 which determines the polarity of the reference voltages for the demodulator 5 in accordance with the polarity of the digital input signals imparted to the "and" gates 11 to 18, and which supplies the reference voltage to the "and" gates 11 to 18, may be omitted, and a conventional clock reference voltage source substituted therefor. Also in certain systems in which negative numbers are represented in two complement form an additional "and" gate and a transistor associated therewith may be employed, and an additional winding may be employed in the transformers 2 and 4 which are in opposition to the windings presently therein.

What is claimed is:

1. In a digital to analog converter of the character described, a source of digital information including a computer, a digital input circuitry which comprises; a plurality of "and" gates which are adapted to receive digital information imparted thereto in binary form from said source of information in accordance with the magnitude of the information being imparted, a plurality of transistors one each of which connected to each of said "and" gates by a conductor through which the information imparted to said "and" gates is fed to base electrodes of said transistor, each of the emitters of said transistors being connected to a ground through an emitter resistor, and each of the collectors of said transistors being conected to conductor means through which a low collector voltage is constantly applied, said emitter resistors being so selected that each one thereof proportionately weights the binary input information imparted thereto; an A.C. amplifier; means by which said digital information is imparted to said amplifier in A.C. form; a full wave demodulator, means by which the A.C. output voltage of said amplifier is imparted to said demodulator, said demodulator being operative to convert the A.C. voltage imparted thereto to a proportional D.C. output voltage of either positive or negative polarity, said computer being adapted to transmit positive and negative pulses according to the polarity of the digital information received by the "and" gates from said computer, a logic circuitry which is connected between said demodulator and said computer and by said computer is operative to determine the polarity of said D.C. output in accordance with the polarity of the said digital information imparted to said input circuitry, and an output circuit through which said D.C. output voltage is imparted to a load.

2. A digital to analog converter as defined by claim 1 in which the means by which said digital information is imparted to said A.C. amplifier from said transistors in A.C. form comprises a summing transformer having the primary winding thereof interposed in said conductor means and the secondary winding thereof interposed in said A.C. amplifier circuit, said summing transformer being so designed that the D.C. resistance in the primary winding thereof and the reflected impedance in the secondary winding thereof are negligible when compared to said emitter resistors; and in which the means by which the A.C. output of said amplifier is imparted to said demodulator comprises a step-up transformer having the primary winding thereof interposed in said amplifier circuit and the secondary winding thereof interposed in said demodulator circuit.

3. A digital to analog converter as defined by claim 2 in which a series resistor is interposed in each of the conductors between said "and" gates and said transistors, said series resistors being so selected that when digital information is present each transistor is operated at a point immediately below saturation where the collector junction voltage is zero.

4. A digital to analog converter as defined by claim 3 in which said A.C. amplifier comprises a pair of transistors having the emitters thereof connected together by a conductor in which the secondary winding of said summing transformer is interposed, and the collectors thereof connected together by a conductor in which the primary winding of said step-up transformer is interposed.

5. A digital to analog converter as defined by claim 4 in which said full wave demodulator comprises a first pair of transistors consisting of a first transistor and a second transistor, and an opposed second pair of transistors consisting of a third transistor and a fourth transistor, the collector of said first transistor being connected to the collector of said third transistor by a conductor in which the said secondary winding of said step-up transformer is interposed, the collectors of said second and fourth transistors each being connected to the positive side of said output circuit, the emitters of said first and second transistors being connected together by an interposed conductor, and the emitters of said third and fourth transformers being connected together by another interposed conductor; a first reference transformer by which a reference voltage is applied to said first pair of transistors, and a second reference transformer by which a reference voltage is applied to said second pair of transistors, the polarity of said second reference transformer being opposite to the polarity of said first reference transformer; and reference voltage conductor means by which the primary windings of said first and second reference transformers are connected to said logic circuitry whereby the polarity of said first and second reference transformers may be reversed by said logic circuitry in accordance with the polarity of the digital information being imparted to said digital input circuitry.

6. A digital to analog converter as defined by claim 5 in which said logic circuitry comprises an "or" gate the output of which is imparted to the primary windings of said first and second reference transformers through said reference voltage conductor means, a pair of "and" gates the outputs of which are adapted to be imparted to said "or" gate, a transistor astable multivibrator which is operative to impart pulses 180° out of phase to said logic circuitry "and" gates and to impart a reference voltage to the said digital input circuitry "and" gates, and conductor means by which polarity pulses are adapted to be imparted to the said logic circuitry "and" gates thereof from said source of digital information in accordance with the polarity of the digital information being imparted to said digital input circuitry, positive pulses being imparted to one of the said logic circuitry "and" gates and negative pulses being imparted to the other "and" gate thereof.

7. A digital to analog converter as defined by claim 6 in which a filter network is interposed in said output circuit.

References Cited by the Examiner

UNITED STATES PATENTS

| | | | |
|---|---|---|---|
| 2,875,392 | 2/1959 | Pinckaers | 318—298 |
| 2,896,141 | 7/1959 | Stoudenmire | 318—24 |
| 2,922,930 | 1/1960 | Schaeve | 317—148.5 |
| 2,977,523 | 3/1961 | Cockrell | 318—331 |
| 3,019,426 | 1/1962 | Gilbert | 340—347 |
| 3,022,454 | 2/1962 | Millis | 321—47 |

MALCOLM A. MORRISON, *Primary Examiner.*

JOHN F. BURNS, *Examiner.*